June 21, 1960  L. W. ERATH ET AL  2,942,187
ELECTROSTATIC MEANS FOR INDICATING VOLTAGE AMPLITUDE
Filed Oct. 31, 1957  3 Sheets-Sheet 1

INVENTORS
Louis W. Erath
Larry J. Stroman
BY
Burns, Doane, Benedict & Sons
ATTORNEYS

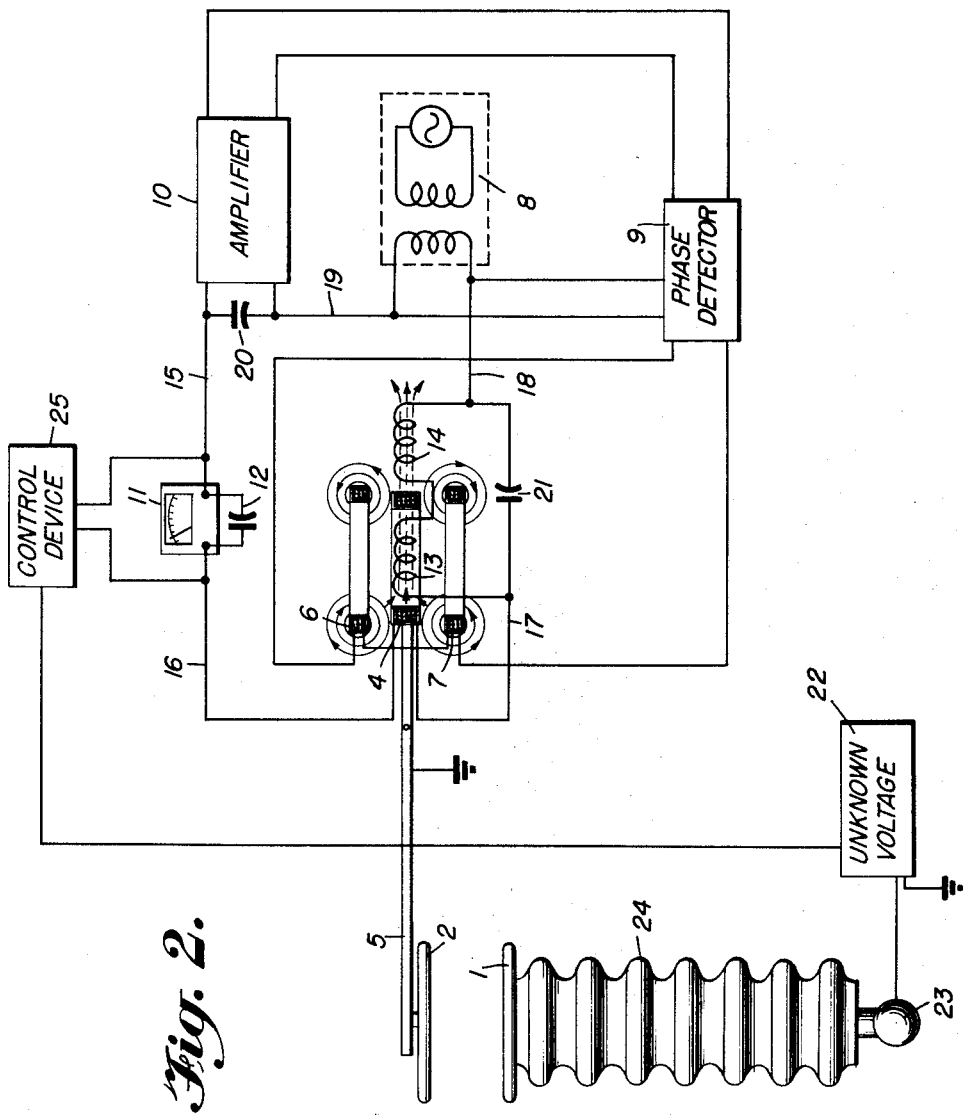

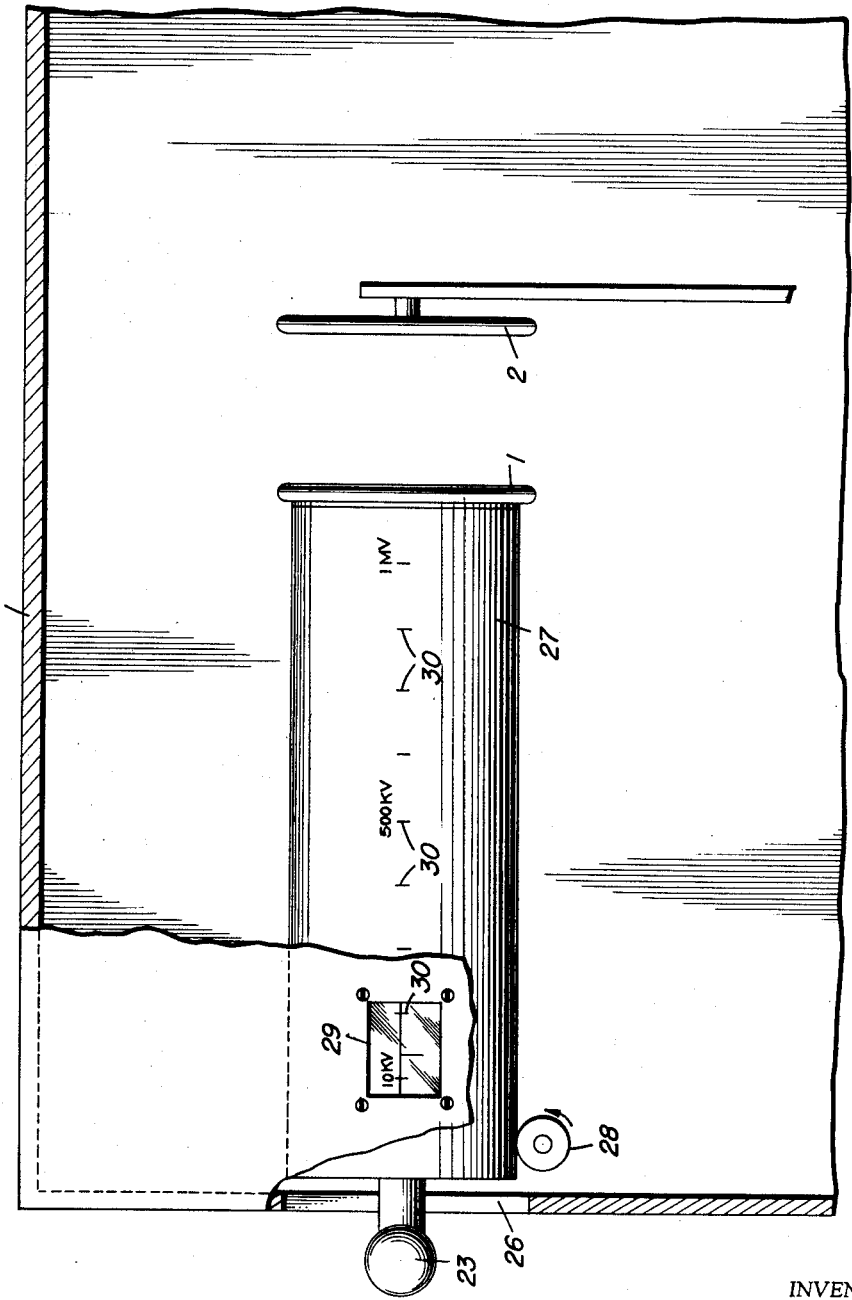

United States Patent Office

2,942,187
Patented June 21, 1960

2,942,187

ELECTROSTATIC MEANS FOR INDICATING VOLTAGE AMPLITUDE

Louis W. Erath and Larry J. Stroman, Houston, Tex., assignors, by mesne assignments, to Dresser Industries, Inc., Dallas, Tex., a corporation of Delaware Filed Oct. 31, 1957, Ser. No. 693,680

13 Claims. (Cl. 324—109)

This invention relates to detection of the amplitude of an unknown voltage, and more particularly to electrostatic detection and control of the amplitude of an electrical voltage.

The problem intended to be solved by the method and apparatus of the present invention is the measurement and control of very high voltages. In particular, in some circumstances it is desirable to be able to regulate the amplitude of voltage from a source having an output of the order of 10,000 volts to within plus or minus three-hundredths of a percent. Previous solutions to this problem have usually involved the use of resistors to divide the voltage down to a convenient level and apparatus to compare the low level voltage with a reference voltage. This approach is costly, inefficient, and impractical, since resistors with the requisite stability are very expensive, yet 100 or more of such resistors might be necessary to perform the desired function. Further, a voltage of the order indicated would have to be divided by a factor of the order of hundreds in order to permit measurement by this method, and any error would be divided by the same factor, so that the apparatus would be inherently inaccurate. Also, the power necessary to operate the voltage divider of this system might be many times the useful load on the supply, so that a much larger supply would be required than is actually necessary for the load.

In the past it has been suggested to measure the amplitude of a high voltage by electrostatic means, in which the voltage was applied between a fixed and a movable electrode to cause a force to be exerted on the movable electrode moving it against the restraining force of a spring to a spacing from the fixed electrode determined by the amplitude of the voltage. The spacing between the two electrodes was used as a measure of the amplitude of the voltage. This type of meter requires relative motion of the plates or electrodes of the system. Motion of the plates has adverse effects including variation of capacity between the plates with voltage and variation of spacing between the plates with voltage. The first effect is undesirable if a voltage other than a D.C. voltage is to be measured. The second effect causes the spacing between the plates to be smallest when the voltage is highest and determines the minimum spacing of the plates and therefore the sensitivity of the instrument.

The method and apparatus of the present invention utilizes the electrostatic voltmeter principle, but opposes the force causing relative movement between the plates so that the electrodes remain at a relatively fixed spacing from each other. Thereby, the undesired effects of relative movement between the plates mentioned above are avoided.

The principle of the present invention involves opposition of the electrostatic force between the plates by a force generated by a dynamometer-type device. Any relative displacement of the plates of the measuring device is detected by a transducer which provides an error voltage which in turn drives a current through the dynamometer, and the dynamometer generates a force urging the plates back to their normal spacing.

More particularly, the apparatus of the present invention includes a linear differential transducer for detection of translation of the movable electrode or plate of the instrument from its normal position and translation thereof into an electrical voltage. This voltage is applied to a dynamometer forming a part of the measuring instrument to drive a current therethrough which generates a force opposite to the force exerted on the plates by the unknown voltage. One of the elements of the transducer also performs one of the functions of the dynamometer, and the current through this element has an amplitude directly proportional to the amplitude of the unknown voltage.

The current above referred to can be used to actuate an ammeter to measure the amplitude of the unknown voltage, or to actuate a control device to adjust the amplitude of the unknown voltage, or both.

The apparatus of the invention also includes novel insulating and connector elements for the measuring instrument, whereby the desired insulation of the high voltage plate may be varied with the sensitivity of the instrument.

The invention will now be more fully described in conjunction with preferred embodiments thereof, as shown in the accompanying drawings.

In the drawings:

Fig. 2 is a schematic diagram of the apparatus of Fig. 1, showing the cooperation between the electrode or plate system and the measuring and control elements; and, Fig. 3 is a view partly in section of the measuring apparatus of the invention modified to provide for automatic adjustment of sensitivity and insulation.

Figure 1:
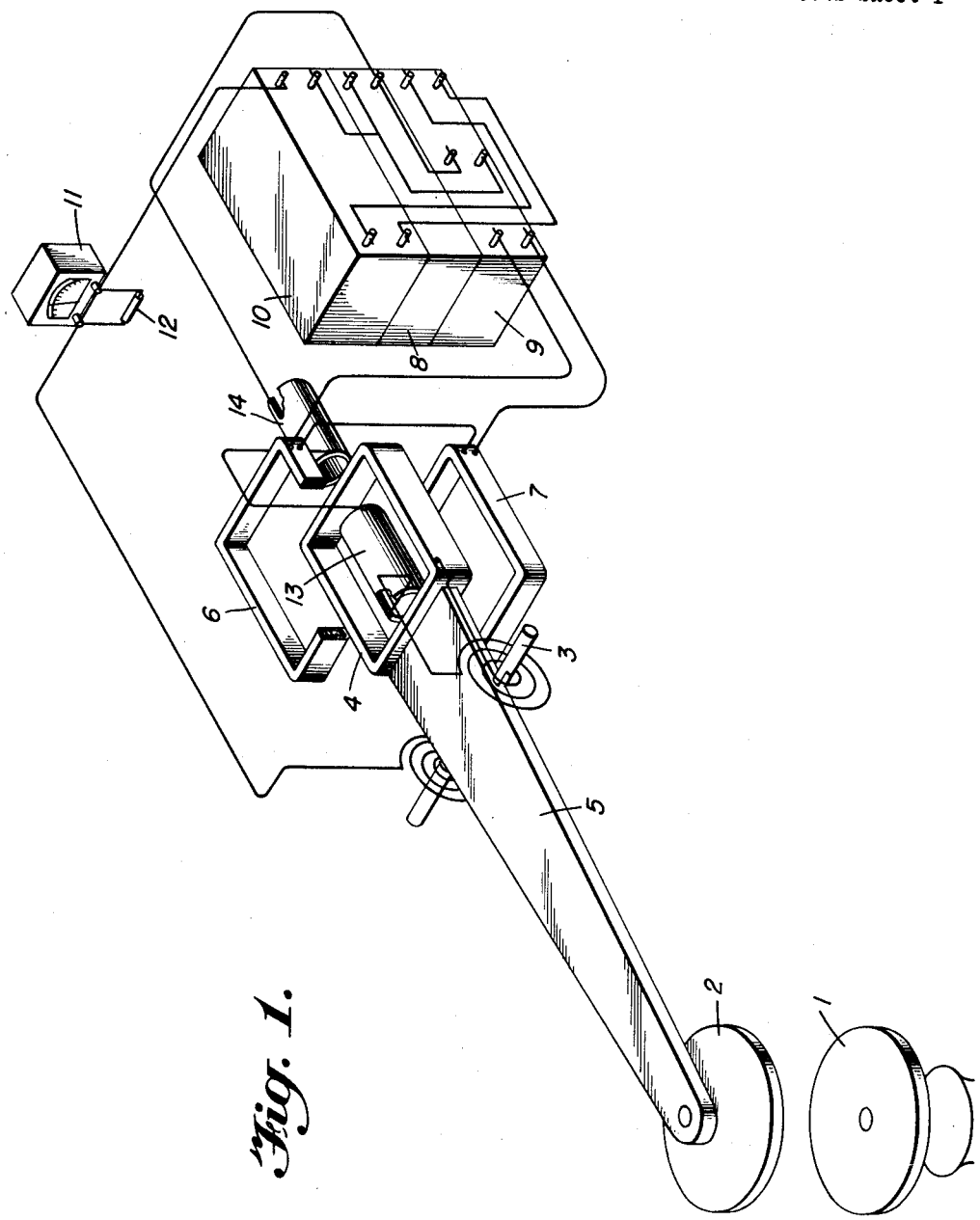
Fig. 1 is a perspective view of the measuring apparatus of the present invention.

Referring first to Fig. 1, the unknown voltage to be measured is applied between a fixed electrode 1 and a movable electrode 2 which is pivoted on a shaft 3. The movable plate 2 is grounded in the instrument so that the grounded terminal of the high voltage source is connected thereto, while the high voltage terminal of the source is connected to the fixed plate 1.

It will be evident that a voltage connected between plates 1 and 2 will generate a force tending to move movable plate 2 with respect to the fixed plate. Any translation of the movable electrode away from its normal position is detected by a linear differential transducer including a coil 4 rigidly fixed to the arm 5 which supports movable plate 2, so that the coil moves with the movable plate. Coils 6 and 7 are positioned at opposite sides of movable coil 4 and are fixed in position. Coils 6 and 7 are also inductively related with coil 4. Coil 4 is supplied with an A.C. current from a high frequency oscillator 8, so that A.C. flux links coils 6 and 7 and generates opposite polarity voltages thereacross. The amplitude of the sum of the voltages across coils 6 and 7 will vary with the position of coil 4 with respect to coils 6 and 7, and therefore the position of plate 2. When coil 4 is equally spaced from coils 6 and 7, the voltages across these coils will be equal and out of phase and therefore add to zero. When coil 4 moves to one side of the normal position, closer to one of coils 6 and 7 than to the other, the closer coil will pick up more voltage than the farther coil and the sum of the two voltages will no longer be zero. The magnitude of the sum of the voltages across coils 6 and 7 will be indicative of the amount of displacement of the farther coil from coil 4, and therefore the movable plate 2 from the normal position, and the polarity of the voltage will be indicative of the direction of this displacement.

The phase of the sum of the voltages across coils 6 and 7 is detected by a phase detector 9 to whose input the series combination of coils 6 and 7 is connected. The phase detector also receives a standard A.C. voltage from high frequency oscillator 8.

The phase detector 9 provides an output voltage which is D.C. in nature and has an amplitude determined by the difference in amplitude between the voltages across coils 6 and 7 and a polarity determined by the phase relationship of this difference voltage with the output of oscillator 8.

The output of the phase detector is amplified in D.C. amplifier 10. The output of the amplifier is connected through an ammeter 11 having a capacitor 12 across it to one side of movable coil 4. The other side of the movable coil is connected to one side of a fixed coil including a pair of windings 13 and 14. The other side of the fixed coil is connected to the high frequency oscillator, so that the series circuit including coil 4 and windings 13 and 14 is provided with a composite voltage including an A.C. component from oscillator 8 and a D.C. component from amplifier 10. The A.C. component of the composite voltage is by-passed around coils 13 and 14 by capacitor 21 so that only coil 4 is fed the A.C. signal. Both moving coil 4 and the split coils 13 and 14 receive the D.C. component of the composite voltage.

As mentioned above, the A.C. current in coil 4 is provided for the position-transducing function of the coil. The D.C. component of the current, however, is provided to furnish a force urging the movable plate to its normal position, in opposition to the force between the fixed and movable plates generated by the unknown voltage. This returning force is between the fixed windings 13 and 14 and the movable coil 4.

Winding 13 is mounted within coil 4, while winding 14 is mounted externally thereof. Nevertheless, both windings are in inductive relationship with movable coil 4.

The circuitry of the measuring apparatus of Fig. 1 is more evident in the schematic diagram of Fig. 2. The series circuit referred to includes a conductor 15 connected between one side of the D.C. amplifier 10 and one terminal of D.C. ammeter 11. The other side of the D.C. ammeter is connected by conductor 16 to one side of movable coil 4. The other side of the movable coil is connected by conductor 17 to one side of winding 13, and the other side of winding 13 is connected to one side of winding 14. The other side of winding 14 is connected by conductor 18 to one side of the high frequency oscillator output, and the other side of the oscillator output is connected by conductor 19 to the other side of the D.C. amplifier. The D.C. amplifier is bypassed for A.C. by a capacitor 20. Also since A.C. has no function in stationary dynamometer windings 13 and 14, these windings are bypassed for A.C. by a capacitor 21 connected across their series combination.

The source of unknown voltage is shown in Fig. 2 at 22 and has its high voltage terminal connected to connector 23. Connector 23 is spaced from fixed plate 1 by a retractable insulator 24, and the connector 23 is electrically connected to the fixed plate 1.

The movable coil 4 and fixed coils 6 and 7 form a linear differential transducer, of conventional and well known characteristics. The windings 13 and 14 form part of a dynamometer, the other part being formed by movable coil 4 of the transducer. Therefore, coil 4 performs a dual fuction in the apparatus of the invention.

If it is desired to control the amplitude of the unknown voltage in order to maintain it at a constant predetermined level, the voltage across ammeter 11 may be supplied to a control device 25 of any suitable design, whose output is connected to the source of unknown voltage to regulate the amplitude of the voltage. The control device may be any suitable servo system, for instance.

In operation of the measuring apparatus so far described, when the unknown voltage is connected between the fixed and movable electrodes or plates 1 and 2, a force is generated between the plates tending to move the movable electrode away from its normal position. Any movement is detected by the transducer including coils 4, 6 and 7 and is translated into an electrical voltage in the following manner. The new position of coil 4 is closer to one of coils 6 and 7 than the other, so that the voltage across the closer coil increases and the voltage across the farther coil decreases. The sum of these voltages no longer adds to zero but is now a finite voltage whose amplitude is indicative of the amount of displacement from the normal position of the movable plate and whose phase, with respect to the standard phase, is indicative of the direction of this displacement. The phase detector produces a D.C. output whose amplitude is directly related to the amplitude of the sum of the voltages across coils 6 and 7 and whose polarity is determined by the polarity of the larger voltage with respect to the reference voltage. The output of the phase detector is therefore an indication of displacement of the movable electrode or plate from its normal position. This D.C. voltage is amplified in amplifier 10 and drives a current through the series combination of coil 4, forming one part of a dynamometer, and a second coil composed of windings 13 and 14, forming the other part of the dynamometer. The current through these coils of the dynamometer causes generation of a force between the coils which is in opposite direction to the force between the fixed and movable plates 1 and 2. Therefore, the plate 2 is returned to its normal position. Actually, any movement of the movable plate 2 away from its normal position would be immediately opposed by the dynamometer, so that the plate 2 effectively would remain in fixed position with respect to plate 1. Thereby, the errors inherent in the known type of electrostatic voltmeter are avoided.

The electrostatic force generated by the unknown voltage between the electrode plates is proportional to the square of the voltage. The electromagnetic force generated by current through the dynamometer is proportional to the square of that current. Therefore, the direct current through the dynamometer varies linearly with the R.M.S. value of the unknown voltage, and the ammeter provides a direct indication of that voltage, on a linear scale.

It may be desirable in some applications to adjust the sensitivity of the measuring apparatus for different levels of voltage to be measured. The apparatus of Fig. 3 is designed to permit such adjustment and to simultaneously change the amount of insulation in the system. In Fig. 3 the fixed and movable electrodes are mounted in a casing 25, and the connector 23 extends outwardly of the casing through a slot 26 on its side wall. The connector 23 is spaced from plate 1 by a cylindrical insulator 27, of any satisfactory material. The position of the fixed plate 1 may be varied by means schematically illustrated as a roller 28. The roller may be mechanically connected to a control external of the casing 25 and which is operated to rotate the roller in clockwise or counterclockwise direction. Connector 23 is electrically connected to plate 1 and is mechanically connected to insulator 27 so as to move therewith.

The casing may have a window 29 through which the insulator body may be viewed, and the insulator body may have indications thereon corresponding to the range of voltage for which the measuring apparatus is set. The window 29 may have an indiactor cooperable with the graduations 30 on the body of insulator 27.

When the plate 1, the insulator 27 and the ball connector 23 are in the positions shown in Fig. 3, the ball connector is at its closest spacing from the wall of casing 25. This is the lowest voltage range of the system, as indicated by the graduations appearing in window 29. In order to increase the sensitivity of the system, the plate 1 is moved farther away from movable plate 2 by rotation of roller 28 in counterclockwise direction, as indicated by the arrow in Fig. 3. Simultaneously, the ball connector 23 moves away from the wall of casing 25, so that the insulation between them becomes greater with increase in range of the voltage about to be measured.

The distance between the ball connector 23 and the adjacent wall of casing 25 must be approximately equal to the distance between plates 1 and 2. This relationship is maintained for all sensitivities of the instrument through the arrangement of Fig. 3.

Increase of sensitivity of the measuring apparatus may be achieved through the use of an evacuated or pressurized chamber. The chamber 25 could be sealed, for this purpose, and evacuated or pressurized during construction. With a moving plate type of electrostatic voltmeter pressurizing or evacuating was impractical, but with the apparatus of the present invention either condition may be readily achieved.

The method and apparatus of the present invention have been designed to detect the amplitude of a high value voltage, which may be either A.C. or D.C. The apparatus employs an electromagnetic field, generated by the dynamometer, rather than a spring, as a reference for the electrostatic force. Detection does not require displacement between the plates of the measuring apparatus to furnish an indication of the magnitude of the voltage, and the error detecting device has a common element (coil 4) with the dynamometer device of the apparatus. It will be noted, also, that the current in the dynamometer varies in direct proportion with the unknown voltage, simplifying measurement and control.

It will be evident that minor modifications could be made within the scope of the general principles herein described. Therefore the invention is not to be considered limited to the specific embodiments disclosed, but rather only by the scope of the appended claims.

We claim:

1. Apparatus for measuring the amplitude of an unknown electrical voltage comprising a fixed and a movable electrode having a predetermined normal spacing adapted to have the unknown voltage applied between them to generate a first force tending to move the movable electrode with respect to the fixed electrode, a coil fixed to the movable electrode so as to move therewith, a pair of fixed coils mounted at opposite sides of the first-mentioned coil and inductively related thereto, means for applying an A.C. voltage to the first-mentioned coil, a phase detector connected to said pair of coils and to said A.C. voltage applying means to provide a D.C. voltage having an amplitude indicative of the sum of the voltages across said pair of coils and a polarity indicative of the phase relationship between said A.C. voltage and the sum of the voltages across said pair of coils, a fourth coil fixed with respect to the movable electrode and inductively related to the first-mentioned coil, means supplying a current varying with the amplitude of said D.C. voltage through the first-mentioned coil and said fourth coil, and means for indicating the amplitude of said current.

2. Apparatus for detecting the amplitude of an unknown electrical voltage comprising a fixed and a movable electrode having a predetermined normal spacing adapted to have the unknown voltage applied between them to generate a force tending to move the movable electrode with respect to the fixed electrode, means including transducing means having a coil movable with the movable electrode operable to furnish an output voltage having an amplitude indicative of displacement of the movable electrode with respect to its normal position, and means including said coil for driving a current responsive to said last-mentioned voltage through said coil to urge the movable electrode toward its normal position, said current having a magnitude varying with the amplitude of said unknown voltage.

3. The apparatus of claim 2 including means for measuring said current to provide an indication of the amplitude of said unknown voltage.

4. The apparatus of claim 2 including a control device supplied with a voltage having an amplitude determined by the magnitude of said current and operable to control the magnitude of said unknown voltage.

5. The apparatus of claim 2 in which said movable electrode is grounded, said apparatus having a connector electrically connected to said fixed electrode and to which the high potential terminal of said unknown voltage is connected, and a retractable insulator between said connector and said fixed electrode.

6. The apparatus of claim 2 including a connector electrically connected to the fixed electrode to which the high voltage terminal of the source of said unknown voltage may be connected, an insulator between the fixed electrode and said connector, and means for moving the fixed electrode, insulator and connector with respect to the movable electrode to change the sensitivity of the detecting apparatus.

7. Apparatus for detecting the amplitude of an electrical voltage comprising a fixed and a movable electrode between which an unknown voltage may be connected, a first coil fixed to the movable electrode to move therewith, a pair of fixed position coils mounted at opposite sides of the first coil and inductively related thereto, means for supplying an A.C. voltage, a phase detector connected to the series combination of the pair of fixed position coils and to said supplying means and operable to compare the sum of the voltages across the pair of coils with said A.C. voltage to furnish a D.C. output voltage having an amplitude determined by the sum of the voltages across said pair of fixed coils and a polarity determined by the phase relation of said sum with the phase of said A.C. voltage, circuit means connecting the A.C. voltage and the D.C. voltage in series to said first coil to drive current therethrough, and a fourth coil fixed in position with respect to the movable electrode and inductively related to said first coil, said fourth coil being connected in series with said first coil, and means shunting the A.C. component of said current around said fourth coil, the D.C. component of said current having an amplitude indicative of the amplitude of the unknown voltage.

8. The apparatus of claim 7 including an ammeter connected in series with said first coil and said fourth coil and including means for shunting the A.C. component of said current around it so that it responds only to the D.C. component of the current.

9. The apparatus of claim 7 including a control device responsive to the amplitude of the D.C. component of said current to control the amplitude of said unknown voltage.

10. Apparatus for detecting the amplitude of an unknown electrical voltage comprising a fixed grounded electrode and a movable electrode adapted to have the unknown voltage connected across them to exert a force tending to move the movable electrode with respect to the fixed electrode, a first coil fixed to the movable electrode to move therewith, a second and a third coil fixed in position with respect to the movable electrode and mounted on opposite sides of the first coil and in inductive relationship thereto, a high frequency oscillator, a phase detector connected to the series combination of said second and third coils and to said oscillator operable to generate a D.C. voltage having an amplitude determined by the amplitude of the sum of the voltages across said second and third coils and a polarity determined by the relative phase of said sum with respect to the voltage from said oscillator, a D.C. amplifier connected to the output of said phase detector, a fourth coil in inductive relationship with said first coil and fixed in position with respect to the movable electrode, circuit means connecting the series combination of the output of said D.C. amplifier and the output of said high frequency oscillator to the series combination of said first and said fourth coils, and a capacitor connected across said fourth coil to shunt the A.C. component of the current in said series circuit around said fourth coil, the amplitude of the direct current flowing in said series circuit being proportional to the amplitude of said unknown voltage.

11. The apparatus of claim 10 including an ammeter connected in said series circuit and having a capacitor connected across it to shunt the A.C. component of said current around it, said ammeter being operable to indicate the amplitude of said unknown voltage.

12. The apparatus of claim 10 including a control device connected in said series circuit and responsive to the amplitude of the D.C. component of said current to control the amplitude of said unknown voltage.

13. The apparatus of claim 10 in which said fourth coil comprises a pair of windings, one mounted within said first coil, and the other mounted outside of said first coil, said capacitor being connected across the series combination of said windings.

References Cited in the file of this patent

UNITED STATES PATENTS

| | | |
|---|---|---|
| 2,136,219 | Scherbatskoy | Nov. 8, 1938 |
| 2,154,260 | Brandenburger | Apr. 11, 1939 |
| 2,261,675 | Edler | Nov. 4, 1941 |
| 2,269,453 | Gayhart | Jan. 13, 1942 |
| 2,404,342 | Harrison | July 16, 1946 |
| 2,412,191 | Zottu | Dec. 3, 1946 |
| 2,593,339 | Ostermann et al. | Apr. 15, 1952 |
| 2,794,955 | Rich | June 4, 1957 |

FOREIGN PATENTS

| | | |
|---|---|---|
| 633,791 | Great Britain | Dec. 30, 1949 |